United States Patent Office 3,020,255
Patented Feb. 6, 1962

3,020,255
UNSATURATED ETHER OF METHYLOL MELAMINE, AND POLYMERS AND COPOLYMERS THEREOF
John K. Magrane and Ralph E. Layman, Jr., Stamford, Conn., assignors to American Cyanamid Company, New York, N.Y., a corporation of Maine
No Drawing. Filed Sept. 14, 1959, Ser. No. 839,563
20 Claims. (Cl. 260—45.3)

This invention relates to novel polymerizable compositions of matter. This invention further relates to polymerizable compositions of matter comprising a vinyloxy methylamino (s) triazine, to methods for preparing same and to the homopolymeric and copolymeric resinous products derived therefrom. More specifically, and in narrower aspects this present invention concerns thermosetting compositions of matter having particular utility in the manufacture of castings, which are obtained by transetherifying an alkoxy methyl melamine with a hydroxy alkyl alkacrylate and to the substantially insoluble and infusible products resulting from the polymerization of said compositions either by themselves or in the presence of other materials containing a polymerizable $CH_2=C<$ group.

The amino triazine structural configuration has been utilized successfully in the preparation of thermosetting resinous compositions of wide utility. One of the outstanding advantages of thermoset products derived from such compositions resides in the excellent degree of thermal stability associated therewith, although these resonous products do exhibit a plurality of other unique desirable characteristics. As inferred, the outstanding thermal stability property of the amino triazone resins is imparted by the symmetrical triazine ring structure.

Melamine resins, so-called, represent the prototype of thermosetting resinous compositions derived from an amino triazine. These resins are extensively used in molding, laminating and protective coating applications and as such are comprised of potentially condensable reaction products of melamine with formaldehyde which serve as monomers in the eventual resinification process. These monomers may be simply the methylolated derivatives of the melamine, the lower alkyl ether of a methylol melamine or lower polymers of either of the latter. The end use application intended for the resin primarily determines whether the condensate is desirably of the alkylated or unalkylated type. Thus, the unalkylated type is ordinarily used in molding applications and the alkylated type is used exclusively for protective coating applications.

In either event, when the monomers represented by the aforesaid derivatives of melamine are converted into a resinous product the ensuing reaction is essentially of the condensation type whereby volatile by-products are generated. In the case of the methylolated melamine derivatives the by-product of the resinification reaction consists of water. Likewise in the condensation of the alkylated derivatives, either inter se or in the presence of a hydroxyl bearing material, an alcohol is generated corresponding to the alcohol employed as the alkylating agent. Notwithstanding the excellent properties associated with the thermosetting products derived from melamine resins, they nevertheless do possess a recognized inadequacy in the form of inferior dimensional stability. Dimensional instability in cured amino resins manifests itself as crazing and cracking within the resinous product and more particularly on the surface thereof. It is believed by those skilled in this art that a minor but nevertheless invariable degree of progressive condensation occurring in the cured resinous product upon aging is responsible for this deleterious crazing or dimensional instability.

The inherent dimensional instability associated with the prior art melamine resin products has been minimized to some extent by various expedients. For instance, in the preparation of molding compositions it has been found that the presence of large quantities of inert material, such as the fillers employed in said compositions, markedly improve the dimensional stability of the cured product. Additionally, large amounts of other types of non-condensable resinous materials (plasticizers, modifiers, etc.) may be used in conjunction with the melamine resin in order to minimize crazing tendencies. This is sometimes observed in the preparation of molding compositions or castings but the approach is more universally practiced in formulating protective coating compositions. It is obvious that these expedients can pose severe formulation limitations. This is particularly true with regard to casting or clear molding applications employing the amino resin.

Since it is known that the volatiles which are released when the melamine resin undergoes the condensation reaction, especially in the post-cure progressive condensation, are responsible for the dimensional instability of such a resinous composition, there have been several attempts in the prior art to obtain monomeric materials based on the triazine configuration which in the resinifying process do not depend entirely on a condensation mechanism involving the evolution of such by-products as water or alcohol.

It is known that methylol derivatives of an amino triazine can be alkenylated precisely in the same manner as they can be alkylated. In this regard, the prior art teaches the reaction of a unsaturated alcohol such as allyl alcohol with any of the methylolated melamines. However, it was found that even though as high as 5 or 6 unsaturated groups of this type may be attached to penta or hexa methylol melamine via the usual etherification procedure, the resultant products nevertheless exhibit very sluggish polymerization potentials and furthermore do not possess the ability to copolymerize with other reactive monomers. While these derivatives of the methylol melamines will convert slowly by an oxidation process to give cured products possessing mediocre physical properties, this method of producing thermosetting resinous compositions from a triazine compound left much to be desired.

We have discovered monomeric compositions readily derived from amino triazines which contain vinyloxy substituents capable of readily polymerizing either by themselves or with other ethylenically unsaturated monomeric materials. Using the compound melamine for an example, the novel polymerizates of this invention may be basically although not exclusively depicted by the following structural formula:

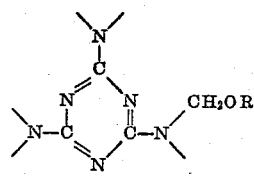

where R represents the following formula:

and where $R_1$ is hydrogen, an alkyl group containing not in excess of 4 carbon atoms or halogen and $R_2$ is an alkylene radical containing not in excess of 4 carbon atoms, and the indicated free valences denoting a $CH_2OR$ radical wherein R has the same meaning as given above, hydrogen alkyl, aryl, alkenyl, aralkyl, alkaryl, alkoxy methyl or any combination of said substituents.

Accordingly, it is an object of this invention to provide a class of readily polymerizable monomeric materials derived from amino triazines.

Another object of this invention is to provide a class of polymerizable resinous compositions of matter based on the symmetrical triazine configuration, the thermoset products of which exhibit improved dimensional stability characteristics.

A further object of the present invention is to provide improved thermosetting homopolymers and copolymers from a vinyloxy methyl melamine.

The detailed discussion and examples given hereinbelow will serve to illustrate more completely these and other objects of this invention.

In accordance with our invention the novel compositions set forth herein are derived from a broad class of amino triazines which may be partially represented by the following formula:

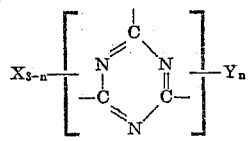

in which Y is NHR, wherein R is a member selected from the group consisting of H, alkyl, aryl, alkenyl, aralkyl, alkaryl; X is Y, or a monovalent R substituent having the same meaning as given above namely, a member selected from the group consisting of H, alkyl, aryl, aralkyl and alkaryl. The designator $n$ represents an integer which is at least 1 and not more than 3. From a consideration of the above formula, it will be noted that when $n$ is 3 there will be no radicals represented by X attached to the triazine nucleus.

More particularly, the compositions of this invention are obtained directly from the alkoxy methyl derivatives of the amino triazines identified hereinabove among others to be shown subsequently. The conditions employed to produce the methylolated products or more precisely the formals of the amino triazines constitute a well known step in the resin art and further details regarding the mechanism and the conditions conventionally observed to obtain such derivatives will not be pursued here. This invention contemplates all of the formals which may be produced from the particular triazine concerned which in turn depends upon the number of active amino hydrogens contained by the triazine compound. Useful polymerizable compositions can be prepared in accordance with this invention from amino compounds corresponding to the formula given above wherein only one active amino hydrogen is present. However, the ultimate resin products derived from such mono-methylolated derivatives in accordance with our invention are limited to thermoplastic linear polymeric materials when employed to produce homopolymers and there are only a limited number of ethylenically unsaturated monomeric materials available which are capable of coreacting with these unsaturated triazines to produce thermosetting resins. On the other hand where an amino triazine is employed having a plurality of active amino hydrogens such as for example melamine is is possible to prepare methylolates corresponding to the formalization of all of the active hydrogens existing in compounds of this type. Generally, it is preferred in this invention to employ amino triazines containing 2 and 3 methylol groups.

In connection with this discussion of the methylolated amino triazines useful in the practice of this invention, or more strictly speaking, the alkoxy derivatives of such methylolated products, it is to be mentioned that certain amino triazines which cannot be represented conveniently by the structural formula such as given above, form suitable derivatives for preparing our polymerizable compositions. In general, hydroxyl substituents on the triazine ring may give rise to complications in forming the alkoxy derivatives and consequently these triazines will be considered individually in light of this invention. For instance, it is known that a compound such as ammelide will methylolate but will alkylate only with extreme difficulty. Accordingly, this triazine is not particularly preferred for our purposes. However, compounds containing one hydroxy substituent such as ammeline or the guanides, will combine with formaldehyde to yield suitable methylolated materials readily capable of being alkylated.

The alkoxy derivatives of the methylolated amino triazines which we employ directly to prepare the compositions of this invention are prepared by reacting any methylolated triazine with various lower aliphatic monohydric alcohols. Examples of such alkylating agents include methanol, ethanol, propanol and butanol. Insofar as the alkylating group is lost in the etherification reaction required to produce the ultimate polymerizable products of this invention, it is preferred to use methanol as it represents the cheapest alkylating agent among other reasons, especially the manner in which it may be readily recovered during the transetherification step. The alkylation reaction as it concerns the preparation of the precursors of this invention is carried out merely by dissolving the methylolated amino triazine in excess of the alkylating alcohol, applying moderate heating if desired and thereupon recovering the alkylated derivative. An acid catalyst is required for the alkylation as is well known in the art.

It is to be mentioned here that the alkylated derivatives contemplated are essentially monomeric compounds. However, it is possible that a certain amount of dimerization or trimerization may occur in the methylolation or alkylation step practiced. Such mixtures are nevertheless useful and oftentimes especially desirable in the practice of this invention.

The polymerizable compositions of this invention are derived by transetherifying the alkoxy or more specifically the methoxy methyl amino triazines as described with a hydroxy alkyl acrylate corresponding to the following formula:

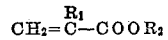

where $R_1$ is either H, halogen or an alkyl group containing not in excess of 4 carbon atoms. $R_2$ represents a hydroxy alkyl radical containing not in excess of 4 carbon atoms. It is preferred that the hydroxyl substituent be primary. These hydroxy alkyl acrylates may be readily prepared by reacting acrylic acid or any of the corresponding alkacrylic acids or ester of either with suitable diols. Additionally, members of this class can be prepared by reacting an alkylene oxide with acrylic acid or any one of the contemplated analogs of acrylic acid.

A specific enumeration of the hydroxy esters corresponding to that described above include the following: 2-hydroxyethyl acrylate, 2-hydroxyethyl methacrylate, 2-hydroxyethyl 2-chloro acrylate, 2-hydroxyethyl 2-ethylacrylate, 2-hydroxyethyl 2-propylacrylate, 2-hydroxyethyl 2-butylacrylate, 3-hydroxypropyl methacrylate, 3-hydroxypropyl 2-propylacrylate, 2-hydroxypropyl acrylate, 3-hydroxypropyl 2-butylacrylate, 3-hydroxypropyl 2-bromoacrylate, 4-hydroxybutyl acrylate, 4-hydroxybutyl methacrylate, 3-hydroxybutyl 2-ethylacrylate, 4-hydroxybutyl 2-butylacrylate, 2-hydroxybutyl 2-propylacrylate, 4-hydroxybutyl 2-chloro acrylate, etc.

The acrylate derivative is preferably reacted with the alkoxy methyl amino triazine in the ratio of one mol per alkoxy group contained by said triazine. It bears repeating here that one of the important objects of this invention is to provide a class of polymerizable triazine compounds which resinify without the evolution of volatile by-products. Accordingly, when it is desired to obtain the maximum of dimensional stability for the cured resinous products derived from the composition of this invention, it is desirable to completely transetherify all of the methylol groups existing in the triazine precursor with an appropriate acrylate. This, however, is not mandatory. For instance suitable products exhibiting improved dimensional stability can be prepared from a compound such as hexamethoxymethylmelamine which has been transetherified with an acrylate in accordance with this invention so as to utilize only 2 or 3 of the reactable alkoxy groups. It can be seen that the resultant compound or composition will resinify by both addition polymerization and condensation.

The transetherification step is preferably carried out under anhydrous conditions and in the absence of any inert media. Many of the alkoxy derivatives contemplated herein in combination with the acrylate reactant will form a clear mobile reaction system upon the application of moderate degree of heat.

An organic solvent medium may be employed if desired. Examples of suitable organic solvents for this purpose include the aromatic hydrocarbons, for example, xylene, toluene, etc. A ketone such as methylethylketone represents a suitable inert medium. Additionally one may employ a polar solvent such as for example dioxane. When employing an organic inert reaction medium it is desirable that the reactants be completely soluble therein. Generally, the alkoxy and more particularly the methoxy methyl amino triazines contemplated herein show adequate solubility in the solvents mentioned hereinabove. However, should increased solubility of the triazine derivative be desired when the transetherification reaction is conducted in an organic medium consisting of an aromatic hydrocarbon, one may employ as the alkoxy group of the triazine derivative higher alkyl groups such as ethyl, propyl, or even butyl.

For the preferred acrylate reactant, the transetherification reaction is carried out at a temperature ranging from room temperature to approximately 75° C. A preferred range is from about 25° C. to about 45° C. Ordinarily it is desirable to conduct the reaction under subatmospheric pressures or partial vacuum in order to facilitate the removal of the volatile product of the transetherification reaction, namely, the alcohol corresponding to the alkoxy group contained by the triazine derivative. If an acrylate is employed wherein the hydroxyl substituent is secondary, a transetherification reaction temperature as high as 125° C. may be advantageously employed.

For efficient transetherification procedures, an acid catalyst is essential. The acid catalyst may be selected from a wide variety of suitable organic and inorganic acids. A specific enumeration of applicable acids include; formic, acetic, propionic, maleic, tartaric, trichloroacetic, toluene sulfonic, phosphoric, hydrochloric, hydrobromic, sulfuric, nitric, and the like. The preferred acids are represented by organic acids having a dissociation constant greater than about $1 \times 10^{-4}$. In the case where a halo acrylate is employed the degree of autocatalysis experienced may obviate the need of an acid catalyst.

The amount of acid catalst may be over a very wide range. Thus amounts from about 0.1% to 10% may be employed depending on the nature of the particular catalyst utilized. Thus, when using strong acids such as hydrochloric it is desirable to employ amounts thereof at the lower range of that indicated. On the other hand where relatively weak organic acids such as acetic are employed one may employ 10% of said acid based on the reactants or even in excess of this amount. Thus it can be seen while the presence of an acid catalyst is essential the amount is not to be regarded as critical.

Ordinarily where one treats alkoxy methyl amino triazines with an acid the condensation of the alkoxy methyl amino triazine is effected. This is particularly true if a strong acid is present. However, we have found that where the reactants consist of an alkoxy methyl amino triazine and a hydroxylated unsaturated ester of the type described hereinabove in substantially stoichiometric relationship the condensation reaction between the respective triazine derivatives is remarkably minimized. In other words, if a stoichiometric relationship between acrylate and the alkoxy methyl group of the amino triazine is observed, the transetherification reaction is substantially preferentially effected to the exclusion of the condensation reaction. This condition is evident if no substantial amount of water is present in the transetherification reaction mixture. The presence of water will favor the hydrolysis and eventual condensation of the methylolated triazine derivatives.

If the transetherification reaction is carried out in the manner as indicated, all of the alcohol given off during the reaction can be attributed to the reaction between the acrylate reactant and the triazine derivative. Accordingly, the amount of alcohol obtained is an indication of the progress of the transetherification reaction. Consequently, when the amount of alcohol collected corresponds to the stoichiometric or theoretical amounts the reaction is stopped and the reaction product recovered. The product may be dried in the usual methods if an inert organic medium was employed. Also, any excess of acid catalyst may be readily removed by the usual purification procedures.

The compositions of this invention may be cured by themselves by the addition thereto of a suitable polymerization catalyst and the application of heat. Suitable addition polymerization catalysts include the acidic peroxides, e.g., benzoyl peroxide, phthaloyl peroxide, octoyl peroxide, succinoyl peroxide and benzoyl acetyl peroxide; alcohol hydroperoxides, e.g., tertiary butyl hydroperoxide, cumene hydroperoxide, tertiary hydroperoxides, e.g., ascaridole. Still other polymerization catalyst might be used in some instances, e.g., aluminum chloride, stannic chloride, and azo type catalysts such as azo isobutyronitrile.

The concentration of catalyst employed is usually small, i.e., for the preferred catalyst, from about 1 part catalyst per 1000 parts of the monomeric material to be polymerized to about 2 parts per 100 parts of said material.

The compositions of this invention may be copolymerized with other ethylenically unsaturated monomeric materials. Thus by appropriately choosing a material to be copolymerized with the vinyloxy compositions of this invention one may obtain a variety of ultimate resinous products ranging from soft, flexible types to hard, refractory types and also spanning the range from thermoplastic to thermoset. The ethylenically unsaturated monomeric materials capable of copolymerizing with the triazine derivatives of this invention may be any one of a number of materials having a polymerizable CH=C< group and desirably having a boiling point in excess of about 60° C. Suitable among these polymerizable compounds are such as styrene, alkyl and halo substituted alpha methyl styrene, alpha chloro styrene, alpha ethyl styrene and the like, or alkyl and halo ring-substituted styrenes such as ortho-, meta- and para-alkyl styrenes, e.g., o-methylstyrene, p-ethylstyrene, m-propylstyrene, 2,4-dimethyl styrene, 2,5-diethylstyrene, o-bromostyrene, p-chloro styrene, 2,4-dichloro styrene, and the like. Alkyl esters of acrylate and methacrylate acid may also be used as copolymerizates. Additionally aliphatic vinyl esters may be employed such as vinyl stearate, vinyl laurate, vinyl butyrate, vinyl acrylate, acrylonitrile, methacrylonitrile, etc. Acrylamide and methacrylamide may also be used to copolymerize with the compositions of this invention. Still further the various allyl esters may be employed. Examples of the diallyl esters which may be used include diallyl phthalate, diallyl succinate, diallyl maleate, diallyl fumarate, diallyl adipate, diallyl sebacate, diallyl itaconate and the like. Triallyl esters may also be used, e.g., triallyl cyanurate, triallyl isocyanurate, triallyl monochloro cyanurate, triallyl trimesate, etc. These polymerizable materials containing the $CH_2=C<$ group may be used singly or in combination with one another.

Additionally, the compositions of this invention may be copolymerized with ethylenically unsaturated polyesters, which copolymerized products have special utility in the preparation of glass-fiber filled laminates. Details as to the nature and preparation of unsaturated polyester resins useful in this manner are disclosed in Ellis Patent 2,255,313 and Kropa Patent Nos. 2,443,735 to 2,443,741, inclusive.

When the novel polymerizable compositions of this invention are employed in combination with any of the monomeric materials mentioned hereinabove, they may be used in amounts ranging from 10 to 90% based on the total weight of the mixture of copolymerizable constituents. A preferred amount of the novel polymerizable compositions is in excess of about 20% on the same basis. Also, when the instant novel compositions are employed in combination with an ethylenically unsaturated polyester the amount of the latter that can be beneficially utilized ranges from about 10 to 90% based on the total weight of the composition and preferably from about 40 to 60% of the monomeric material and correspondingly from 60 to 40% of the unsaturated polyester.

As stated, the compositions of this invention are suitable for use in laminating applications, preparation of adhesives, surface coatings and castings. Conventional formulation procedures can be observed for any specific application wherein the presence of our compositions is utilized. Thus castings may be prepared from these compositions employing the art-known fillers or as stated hereinbefore improved castings may be prepared from unfilled compositions corresponding to the novel polymerizable resinous compositions of this invention.

In order to permit those skilled in the art to understand better now the present invention may be practiced, the following examples are given. These examples are set forth primarily for the purpose of illustration and any specific enumeration of detail contained therein should not be interpreted as a limitation on the case except where indicated in the appended claims. All parts specified are parts by weight unless indicated otherwise.

*Example I*

Hexamethylol melamine is prepared in the following manner. Into a suitable reaction vessel equipped with a stirrer and thermometer are charged 126 parts of melamine and 500 parts of formalin (37% aqueous formaldehyde). The pH of the reaction system is adjusted to weakly alkaline conditions (pH 7.2–7.8) with triethylamine. With stirring, the reaction mixture is heated to about 90° C. in 10 minutes and then allowed to cool. Upon cooling a voluminous white deposit is obtained. At a temperature of 40–50° C. the reaction material is dehydrated with the application of vacuum. Dehydration is continued in the stated temperature range until the water content of the reaction product has been reduced to about 6%. The product obtained corresponds to hexamethylol melamine containing the moisture content as indicated.

To 324 parts of said partially dehydrated product are added 150 parts of methyl alcohol and 1 part of concentrated nitric acid. Stirring is accomplished at room temperature whereupon after 1 or 2 minutes a clear solution is obtained. After 10 minutes' stirring at room temperature the etherified product is neutralized with sodium bicarbonate, filtered and the solution evaporated in vacuo. The resultant product is dissolved in benzene, freed from remaining quantities of salt and the resultant solution again evaporated. Several repeated recrystallizations from petroleum ether and a final recrystallization from water results in a pure product of hexamethoxymethyl melamine exhibiting a melting point of 55° C.

Into a suitable reaction vessel equipped with a thermometer, stirrer and means for collecting volatile distillates are charged 200 parts of the above described hexamethoxymethyl melamine, 70 parts of xylol, 200 parts of beta hydroxy ethylmethacrylate and 2 parts of para toluene sulfonic acid. With stirring the reaction mixture is heated to 85° C. and held at approximately this temperature for an additional 2 hours. After expiration of this time, the amount of methanol collected corresponds to substantially complete transetherification of the methacrylate charged. The xylol is then removed with the application of vacuum.

To 10 parts of the transetherified product described is added 0.1% benzoyl peroxide. This mixture is charged to a suitable mold and the mold placed in an oven at 55° C. and retained therein for 20 hours. Upon removal from the oven and cooling, the casting was discharged from the mold and was found to be optically clear and hard and to exhibit a bright surface appearance. The molding was observed to be substantially insoluble and infusible and to evidence a high degree of physical strength properties.

*Example II*

A polyether resin is prepared by reacting 3 mols of phthalic anhydride, 3 mols of maleic acid and 6.6 mols of propylene glycol until esterification is substantially complete, as indicated by an acid number of about 30–40. Next, there is added the transetherification product of Example I in a sufficient amount to equal ½ of the polyester resin present, and 0.02% by weight of hydroquinone based on the total weight of the unsaturated polyester. To 200 parts of this thermosetting resinous composition are added 2 parts of methylethyl ketone peroxide catalyst. The mixture is cast into ⅛" thick castings by pouring the mixture between two glass plates separated by a rubber gasket. Curing is accomplished at a temperature of about 110° C. for 18 hours. The resultant casting was substantially insoluble and infusible and exhibited especially marked degree of heat resistance.

*Example III*

Tetramethylol benzoguanamine is prepared in the following manner. Into a suitable reaction vessel equipped with a stirrer and thermometer are charged 375 parts of benzoguanamine and 1000 parts of formalin representing a molar ratio of reactants of 1:6, respectively. The slurry of the two reactants is adjusted to pH 9.4 with 0.5 N sodium hydroxide, and heated to 70° C. The reaction system is held at the stated temperature for 5 minutes with stirring until the system becomes clear. With continued stirring the reaction mixture is heated an additional 4 hours at approximately 70° C. and then cooled at 50° C. Almost immediately upon reaching the lower temperature, crystals begin to form, and after an additional 15 hours holding time at between 40°–50° C. the accumulated crystalline precipitate is filtered, washed with 450 parts of cold water, and dried at 60–70° C. to yield the tetramethylolated derivative.

The tetramethylol benzoguanamine is alkylated to produce tetramethoxymethyl guanamine in the following manner. Into a suitable reaction vessel equipped with a thermometer and stirrer are charged 210 parts of the dehydrated tetramethylol benzoguanamine described above, 300 parts of methylol and 2 parts of concentrated nitric acid. Stirring is accomplished at room temperature and the reaction mixture maintained at room temperature with occasional stirring over a 30 minute period. The product is neutralized with sodium bicarbonate, filtered and evaporated to dryness in vacuo.

The methyl ether of the tetramethylol benzoguanamine described directly above is transetherified with 2-hydroxyethyl acrylate in the following manner. Into a suitable reaction vessel equipped as previously indicated are charged 70 parts of said methyl ether and 140 parts of said acrylate. The reaction mixture is heated to 60–68° C. and held within this range with stirring for approximately 30 minutes. A 30 part weight loss (methanol) is experienced during this reaction period. The transetherified product is then cooled to room temperature.

To 54 grams of the transetherified product of this example were added 0.6 gram of benzoyl peroxide and a compatible mixture of the two effected. The catalyzed product was then poured into a mold and cured at 55° C. for 16 hours to yield a hard, glossy, clear casting. The casting when aged one week at 55° C. showed no crazing or cracking failures.

A small portion of the catalyzed product of this example was also cast as a thin film on glass and baked 15 minutes at 275° F. to yield a clear, hard, mar-resistant coating.

*Example IV*

Into a suitable reaction vessel equipped with a thermometer and stirrer are charged 13 parts of hexamethoxymethyl melamine (0.033 mol), 24 parts of 2-hydroxyethyl acrylate (0.2 mol) and 0.13 part of toluene sulfonic acid. With stirring the temperature of the reaction mixture is raised to 60–65° C. and maintained at said temperature range for approximately 60 minutes. The reaction product is then cooled to room temperature.

To a portion of the transetherification product of this example was added 1% benzoyl peroxide. After suitably dispersing the catalyst in the product, the product was then poured into a mold, after which any air in the mold was replaced by nitrogen. The mold was heated in an oven at 55–60° C. for 16 hours. The resultant casting was hard, clear and colorless. Extended aging at room temperature of the casting revealed that same did not develop any perceptible degree of crazing or cracking.

Additionally, a small portion of the catalyzed product of this example was drawn down as an 0.003 inch film on glass and baked 30 minutes at 225° F. The baked film thus produced was clear, colorless, mar-proof and exhibited unusual hardness.

*Example V*

A mixture was made of 20 parts of the transetherification product of Example 3, that is, the uncatalyzed transetherified product of 2-hydroxyethyl acrylate and the methyl ether of the tetramethylol benzoguanamine with 40 parts of styrene. To the mixture was added 0.6 part of benzoyl peroxide and the catalyst suitably dissolved therein. The catalyzed mixture was then poured into a glass mold and the mold then heated in an oven at 55° C. for 16 hours. The resultant mold article was clear, hard and glossy. The molding was found capable of being aged at 55° C. for several weeks without evidencing any deleterious cracking or crazing.

*Example VI*

Into a suitable reaction vessel equipped with a thermometer and stirrer are charged 110 parts of $N^2,N^4,N^6$-tris(methoxymethyl) $N^2,N^4,N^6$-trimethyl melamine, 150 parts of 2-hydroxyethyl acrylate and 2.5 parts of toluene sulfonic acid. The reaction mixture is quickly heated to 70–75° C. and held within this temperature range for approximately 1 hour. The reaction product then is cooled to room temperature.

To a portion of the above-described product was added 1% benzoyl peroxide and dissolved therein. The catalyst product was then heated in a mold in an oven at 55° C. for 8 hours to produce a clear, hard and glossy casting. Extended aging of the casting at 55° C. indicated that the cured resinous product had excellent resistance to crazing and cracking.

A portion of the catalyst reaction product of this example was utilized to produce a coating 0.0015 inch thick on a steel panel. The coating was baked 15 minutes at 225° F. to produce a clear, glossy finish characterized by exceedingly hard qualities.

What is claimed is:

1. A polymerizable composition of matter comprising the transetherification reaction product of a lower alkoxymethylamino 1,3,5-triazine and a monohydroxy compound represented by the formula:

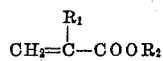

where $R_1$ is a member selected from the class consisting of H, halogen and alkyl groups containing not in excess of 4 carbon atoms and $R_2$ is a monohydroxy substituted alkyl group containing not in excess of 4 carbon atoms.

2. A polymerizable composition of matter comprising the transetherification reaction product of a $N^2,N^4,N^6$-tris(lower alkoxymethyl) $N^2,N^4,N^6$-trialkyl melamine and a monohydroxy compound represented by the formula:

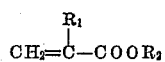

where $R_1$ is a member selected from the class consisting of H, halogen and alkyl groups containing not in excess of 4 carbon atoms and $R_2$ is a monohydroxy substituted alkyl group containing not in excess of 4 carbon atoms.

3. A polymerizable composition of matter comprising the transetherification reaction product of hexamethoxymethyl melamine and a monohydroxy compound represented by the formula:

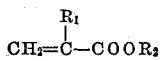

where $R_1$ is a member selected from the class consisting of H, halogen and alkyl groups containing not in excess of 4 carbon atoms and $R_2$ is a monohydroxy substituted alkyl group containing not in excess of 4 carbon atoms.

4. A polymerizable composition of matter comprising the transetherification reaction product of a lower alkoxymethyl guanamine and a monohydroxy compound represented by the formula:

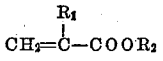

where $R_1$ is a member selected from the class consisting of H, halogen and alkyl groups containing not in excess of 4 carbon atoms and $R_2$ is a monohydroxy substituted alkyl group containing not in excess of 4 carbon atoms.

5. A polymerizable composition of matter comprising the transetherification reaction product of an $N^2,N^4,N^6$-tris(lower alkoxymethyl) $N^2,N^4,N^6$-trialkyl melamine and 2-hydroxyethyl methacrylate.

6. A polymerizable composition of matter comprising the transetherification reaction product of hexamethoxymethyl melamine and 2-hydroxyethyl methacrylate.

7. The polymerization product obtained by heat curing in the presence of an addition polymerization catalyst a polymerizable composition of matter comprising the transetherification reaction product of a lower alkoxymethylamino 1,3,5-triazine and a monohydroxy compound represented by the formula:

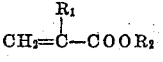

where $R_1$ is a member selected from the class consisting of H, halogen and alkyl groups containing not in excess of 4 carbon atoms and $R_2$ is a monohydroxy substituted alkyl group containing not in excess of 4 carbon atoms.

8. A substantially insoluble and infusible polymerization product obtained by heat curing in the presence of an addition polymerization catalyst, a composition of matter comprising the transesterification reaction product of a $N^2,N^4,N^6$-tris(lower alkoxymethyl) $N^2,N^4,N^6$-trialkyl melamine and a monohydroxy compound represented by the formula:

$$CH_2=C(R_1)-COOR_2$$

where $R_1$ is a member selected from the class consisting of H, halogen and alkyl groups not in excess of 4 carbon atoms and $R_2$ is a monohydroxy substituted alkyl group containing not in excess of 4 carbon atoms.

9. The substantially insoluble and infusible polymerization product obtained by heat curing in the presence of an addition polymerization catalyst, a composition of matter comprising the transetherification product of hexamethoxymethyl melamine and 2-hydroxyethyl methacrylate.

10. A polymerizable composition comprising the transetherification reaction product according to claim 1 and a monomeric material containing a $CH_2=C<$ group copolymerizable with said product.

11. A polymerizable composition of matter comprising the transetherification reaction product according to claim 1 and styrene.

12. A polymerizable composition of matter comprising the transetherification reaction product according to claim 2 and styrene.

13. A polymerizable composition of matter comprising the transetherification reaction product according to claim 1 and an unsaturated polyester resin obtained by esterifying an alpha, beta-ethylenically unsaturated dicarboxylic acid and a saturated polyhydric alcohol.

14. The substantially insoluble and infusible polymerization product obtained by heat curing in the presence of a superoxide catalyst the composition according to claim 13.

15. A polymerizable composition of matter comprising the transetherification reaction product of a lower alkoxymethylamino 1,3,5-triazine having the general formula:

[formula]

wherein $R_3$, $R_4$ and $R_5$ are members selected from the group consisting of hydrogen, alkyl, alkenyl, aryl, aralkyl, alkaryl, and lower alkoxymethyl, X is a member selected from the group consisting of hydrogen, alkyl, alkenyl, aryl, aralkyl, and alkaryl, and $n$ is an integer of from 1 to 2, and a monohydroxy compound represented by the formula:

$$CH_2=C(R_1)-COOR_2$$

wherein $R_1$ is a member selected from the group consisting of hydrogen, halogen, and alkyl groups containing not in excess of 4 carbon atoms and $R_2$ is a monohydroxy substituted alkyl group containing not in excess of 4 carbon atoms.

16. A polymerizable composition of matter comprising the transetherification reaction product of $N^2,N^4,N^6$-tris-(methoxymethyl)-$N^2,N^4,N^6$-trimethyl melamine and a monohydroxy compound represented by the formula:

$$CH_2=C(R_1)-COOR_2$$

wherein $R_1$ is a member selected from the group consisting of hydrogen, halogen, and alkyl groups containing not in excess of 4 carbon atoms and $R_2$ is a monohydroxy substituted alkyl group containing not in excess of 4 carbon atoms.

17. A polymerizable composition of matter comprising the transetherification reaction product of a lower alkoxymethylamino 1,3,5-triazine having the general formula:

[formula]

wherein $R_3$, $R_4$ and $R_5$ are members selected from the group consisting of hydrogen, alkyl, alkenyl, aryl, aralkyl, alkaryl, and lower alkoxymethyl, X is a member selected from the group consisting of hydrogen, alkyl, alkenyl, aryl, aralkyl, and alkaryl, and $n$ is an integer of from 1 to 2, and 2-hydroxyethyl methacrylate.

18. A polymerizable composition of matter comprising the transetherification reaction product of $N^2,N^4,N^6$-tris-(methoxymethyl)-$N^2,N^4,N^6$-trimethyl melamine and 2-hydroxyethyl methacrylate.

19. The polymerization product obtained by heat curing, in the presence of an addition polymerization catalyst, a composition of matter comprising the transetherification reaction product of a lower alkoxymethylamino 1,3,5-triazine having the general formula:

[formula]

wherein $R_3$, $R_4$ and $R_5$ are members selected from the group consisting of hydrogen, alkyl, alkenyl, aryl, aralkyl, alkaryl, and lower alkoxymethyl, X is a member selected from the group consisting of hydrogen, alkyl, alkenyl, aryl, aralkyl, and alkaryl, and $n$ is an integer of from 1 to 2, and a monohydroxy compound represented by the formula:

$$CH_2=C(R_1)-COOR_2$$

wherein $R_1$ is a member selected from the group consisting of hydrogen, halogen, and alkyl groups containing not in excess of 4 carbon atoms and $R_2$ is a monohydroxy substituted alkyl group containing not in excess of 4 carbon atoms.

20. A substantially insoluble and infusible polymerization product obtained by heat curing, in the presence of an addition polymerization catalyst, a composition of matter comprising the transetherification reaction product of $N^2,N^4,N^6$-tris(methoxymethyl) - $N^2,N^4,N^6$ - trimethyl melamine and a monohydroxy compound represented by the formula:

$$CH_2=C(R_1)-COOR_2$$

wherein $R_1$ is a member selected from the group consisting of hydrogen, halogen, and alkyl groups containing not in excess of 4 carbon atoms and $R_2$ is a monohydroxy substituted alkyl group containing not in excess of 4 carbon atoms.

References Cited in the file of this patent

UNITED STATES PATENTS

| | | |
|---|---|---|
| 2,448,338 | Widmer | Aug. 31, 1948 |
| 2,885,388 | Sallmann et al. | May 5, 1959 |